United States Patent [19]

Vitellaro

[11] 4,376,005
[45] Mar. 8, 1983

[54] METHOD OF MAKING HOSE

[75] Inventor: Frank A. Vitellaro, Trenton, N.J.

[73] Assignee: Dayco Corporation, Dayton, Ohio

[21] Appl. No.: 189,973

[22] Filed: Sep. 22, 1980

[51] Int. Cl.³ .............................................. B31C 13/00
[52] U.S. Cl. ................................ 156/195; 156/244.13;
156/244.17; 156/272.4; 156/275.1
[58] Field of Search ............... 156/195, 191, 171, 149,
156/143, 272, 273, 274, 244.17, 244.15, 244.13,
309.6, 308.4, 272.4, 380.1, 380.9, 272.2, 379.6,
375.1, 375.3; 138/122, 129

[56] References Cited
U.S. PATENT DOCUMENTS

| 3,199,541 | 8/1965 | Richitelli | 138/129 |
| 3,255,780 | 6/1966 | Squirrell | 138/122 |
| 3,477,891 | 11/1969 | Hawerkamp | 156/143 |
| 3,548,882 | 12/1970 | Goodrich | 156/187 |
| 3,945,867 | 3/1976 | Heller, Jr. et al. | 156/143 |
| 4,063,988 | 12/1977 | Choiniere et al. | 156/195 |

FOREIGN PATENT DOCUMENTS 1197595  7/1970  United Kingdom ............... 156/195

Primary Examiner—Michael W. Ball
Attorney, Agent, or Firm—Joseph V. Tassone

[57] ABSTRACT

A convoluted hose and method of making same are provided wherein such hose is comprised of a polymeric strip which has a first and second connecting means defining opposite side edge portions thereof and the strip is disposed in a helical pattern with the first and second connecting means connected together to define the hose having alternating crests and troughs and the hose has an electromagnetically heatable material disposed between the first and second connecting means with the material having been subjected to electromagnetic heating action such that the material provides a tenacious heat fused bond between the first and second connecting means.

1 Claim, 11 Drawing Figures

METHOD OF MAKING HOSE

BACKGROUND OF THE INVENTION

1. Field of the Invention

This invention relates to a convoluted hose construction made of a helically wound polymeric strip and method of making same.

2. Prior Art Statement

Hose constructions or hose made by helically winding a polymeric strip are well known in the art and an example of such a hose is presented in U.S. Pat. No. 3,255,780. This patent also discloses a hose made from a polymeric strip having the cross-sectional configuration of the Arabic numeral 5.

However, there are hose applications where it is desired to make each hose of polyethylene, polyproplene, or similar material; and, each of these materials is generally considered in the art as being difficult to bond. Further, each of these materials is considered as being very difficult to bond in a high strength manner in a continuous process.

It has been proposed to provide a so-called electromagnetic bonding of polymeric materials, including polyethylene and polypropylene, by dispersing micronsized magnetic particles within a thermoplastic matrix composition. The composition is then placed between abutting surfaces of the polymeric materials to be bonded and exposed to a magnetic field causing heating of the composition, melting, and subsequent fusion of the polymeric materials and this technique is disclosed in Modern Plastics Encyclopedia, "Volume 56, No. 10A," in an article which begins on page 420.

SUMMARY

It is a feature of this invention to provide an improved convoluted hose construction comprised of a single polymeric strip made of a material which is normally considered difficult to bond.

Another feature of this invention is to provide a hose construction of the character mentioned in a continuous and comparatively inexpensive process, free of helically wound reinforcing means, and wherein the single strip defines practically the entire hose construction.

Another feature of this invention is to provide a hose construction made of a strip of the character mentioned wherein the strip has first and second connecting means defining opposite side edge portions and wherein the strip is disposed in a helical pattern with the first and second connecting means connected together to define the hose construction having alternating crests and troughs and wherein an electromagnetically heatable material is disposed between the first and second connecting means with the material having been subjected to electromagnetic heating action and providing a tenacious heat fused bond between the first and second connecting means.

Another feature of this invention is to provide a hose construction of the character mentioned wherein the electromagnetically heatable material is defined as an integral part of at least one of the side portions of the polymeric strip being helically wound.

Another feature of this invention is to provide a hose construction of the character mentioned wherein the material defining the integral part comprises randomly disposed particles embedded therein which are heatable by electromagnetic induction.

Another feature of this invention is to provide a hose construction of the character mentioned wherein the electromagnetically heatable material comprises a polymeric component having randomly disposed particles embedded therein which are heatable by electromagnetic induction and wherein the component is disposed between the first and second connecting means of the strip.

Another feature of this invention is to provide a hose construction of the character mentioned wherein the polymeric component is defined as a continuous elongate polymeric bead.

Another feature of this invention is to provide a hose construction of the character mentioned wherein the component is defined as a continuous polymeric threadlike member.

Another feature of this invention is to provide an improved method of making a hose construction of the character mentioned.

Therefore, it is an object of this invention to provide an improved hose construction and method of making same having one or more of the novel features set forth above or hereinafter shown or described.

Other details, features, uses, objects and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DETAILED DESCRIPTION

Figure 5:
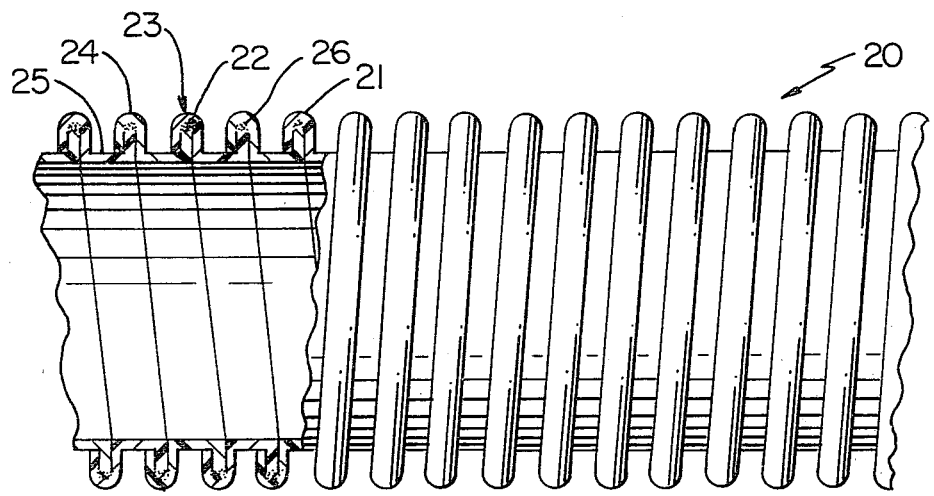
FIG. 5 is a view with parts in cross section, parts in elevation, and parts broken away illustrating the completed convoluted hose construction made by the apparatus and method of FIG. 4.
Figure 6:
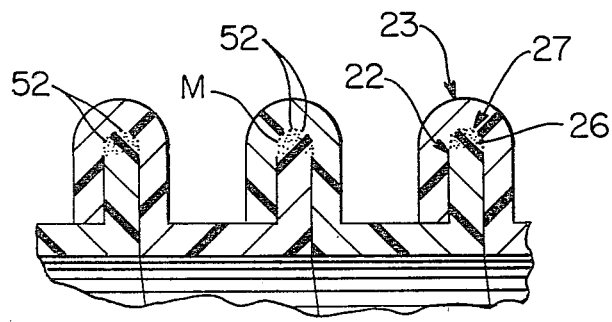
FIG. 6 is an enlarged fragmentary cross-sectional view particularly illustrating a heat fused bond between first and second connecting means of the helically wound polymeric strip defining the hose construction of FIG. 5.
Figure 7:
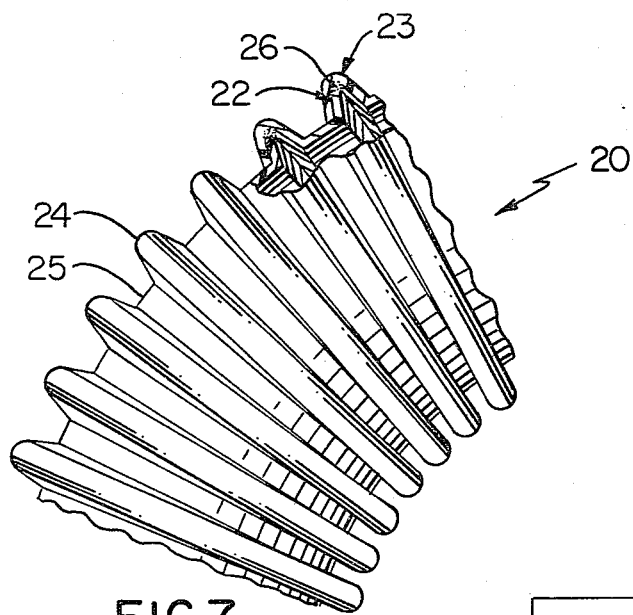
FIG. 7 is a view of the hose construction of FIG. 5 particularly illustrating the highly flexible character thereof.

Reference is now made to FIG. 5 of the drawings which illustrates one exemplary embodiment of a convoluted hose construction or hose of this invention which is designated generally by the reference numeral 20. The hose 20 is comprised of a single polymeric strip 21 which has first connecting means 22 and second connecting means 23 defining opposite side edge portions thereof, and the strip 21 is disposed in a helical pattern with the first and second connecting means connected together to define such hose having alternating crests 24 and troughs 25. The hose 20 comprises an electromagnetically heatable material 26 disposed between the first 22 and second 23 connecting means with the material 26 having been subjected to electromagnetic heating action such that a tenacious heat-fused bond is provided between the first 22 and second 23 connecting means and as shown typically at 27 in FIG. 6.

Figure 1:
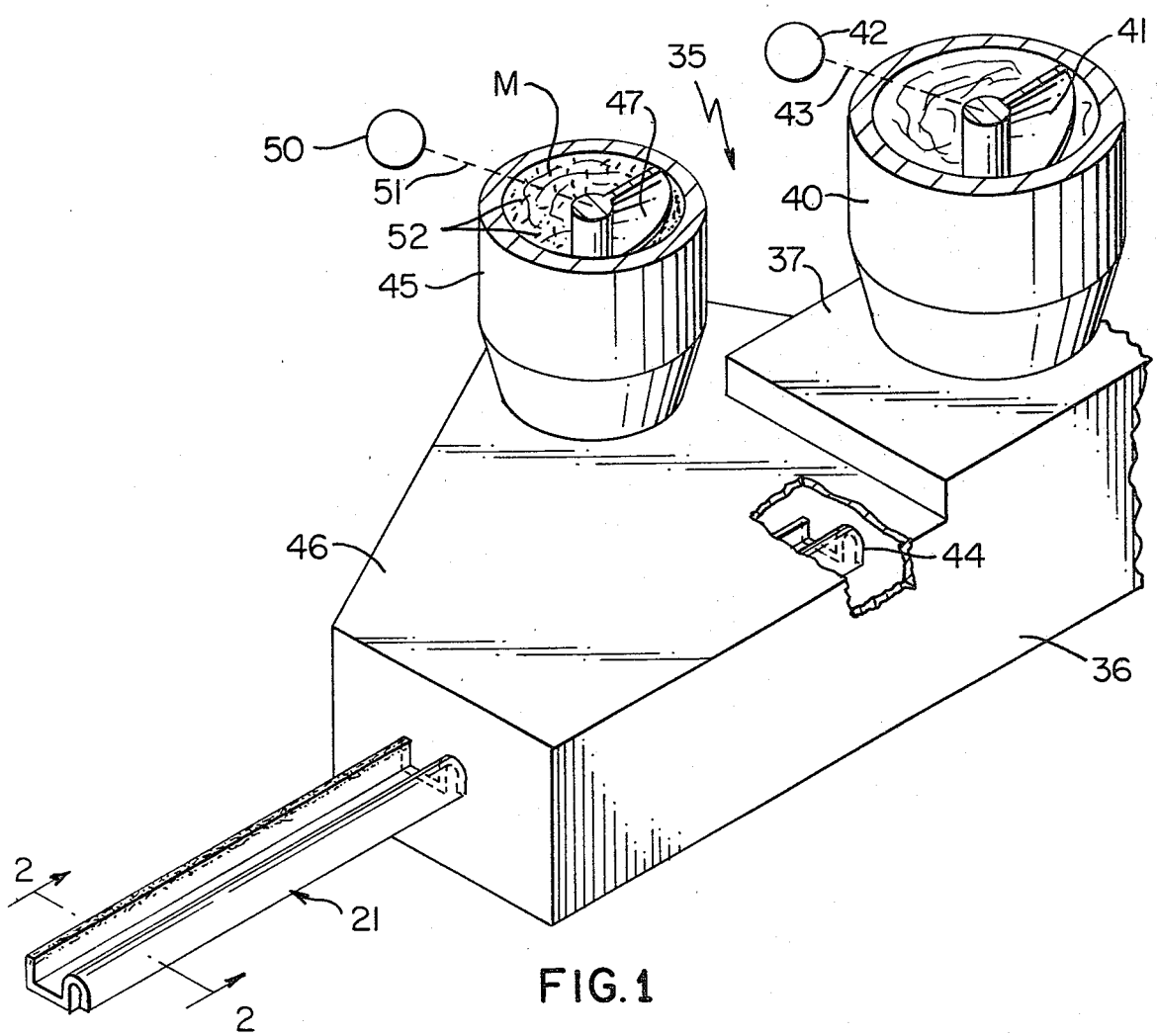
FIG. 1 is a perspective view with parts in elevation, parts in cross section, and parts broken away illustrating an apparatus and method steps utilized in making a polymeric strip which is adapted to be helically wound to make one exemplary embodiment of the hose construction of this invention.
Figure 2:
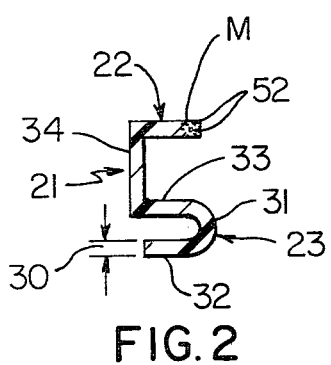
FIG. 2 is a cross-sectional view taken essentially on the line 2—2 of FIG. 1.

The electromagnetically heatable material 26 is defined as an integral part of at least one of the side portions of the polymeric strip and in the exemplary embodiment of the hose 20 of FIG. 5 the material 26 is defined as an integral part of the terminal end portion of the connecting means 22 as will be described in more detail subsequently. As best seen in FIG. 2, the strip 21 has a substantially uniform wall thickness 30 throughout and has an outwardly convex U-shaped portion defined by a bight 31 and a pair of parallel legs 32 and 33 extending from opposite ends of the bight. A lateral extension 34 extends perpendicularly outwardly from one of the parallel legs and in this example the extension 34 extends perpendicularly outwardly from the leg 33 and away from both legs 32-33.

The strip 21 also has a tranverse portion extending from the terminal end of the lateral extension 34 and inasmuch as such transverse portion defines the first connecting means it is identified by the reference numeral 22 and may be referred to interchangeably as transverse portion 22 and first connecting means 22. The U-shaped portion of the strip 21 defined by the bight 31 and parallel legs 32 and 33 defines the second connecting means which has been designated by the reference numeral 23 whereby the U-shaped portion may be referred to interchangeably as U-shaped portion 23 and second connecting means 23.

The polymeric strip 21 has a configuration which facilitates winding thereof in a helical pattern; and, in this example of the invention a cross-sectional configuration which has the general appearance of the Arabic numeral 5, and as will be readily apparent from FIG. 2 of the drawings. However, it is to be understood that the strip 21 may have any desired cross-sectional configuration which facilitates helical winding.

The hose 20 is preferably made utilizing the method steps to be described subsequently in this specification and such steps include providing a polymeric strip having the first connecting means 22 and the second connecting means 23 defined as an integral part thereof and defining opposite side edge portions of the strip. The strip 21 is preferably provided by extruding same through an extrusion apparatus 35 which includes an extrusion head assemby which is designated generally by the reference numeral 36.

The assembly 36 has an upstream portion 37 which may be fed with a hot molten polymeric material which in this example is provided by an extruder 40 of conventional construction. The extruder 40 has a feed screw 41 which is driven by an electric motor 42 through a suitable drive connection 43 and the polymeric material from the extruder exits an extrusion die 44 in the upstream portion 37 of the assembly 36 having the main cross-sectional configuration of the Arabic numeral 5 minus the terminal end portion of the usual rectilinear horizontal leg of the numeral 5.

The extrusion apparatus 35 comprises another extruder 45 which is in flow communication with the downstream portion 46 of the assembly 36 and the extruder 45 has a feed screw 47 which is also driven by an electric motor 50 through a suitable drive connection 51. The extruder 45 provides polymeric material M therefrom and such polymeric material has randomly disposed magnetic particles embedded therein and a few representative ones of such particles are designated by the same reference numeral 52 in FIGS. 2 and 6. The particles 52 are heatable by electromagnetic action and in this example the particles 52 are heatable by electromagnetic induction. The electromagnetically heatable material 26 is defined by the polymeric material M, with its magnetic particles 52, in the terminal end portion of the first connecting means 22. Although the electromagnetically heatable material 26 may comprise any desired part of the first connecting means 22, in this example of the invention the material 26 defines approximately the outer third of the first connecting means 22.

Figure 3:
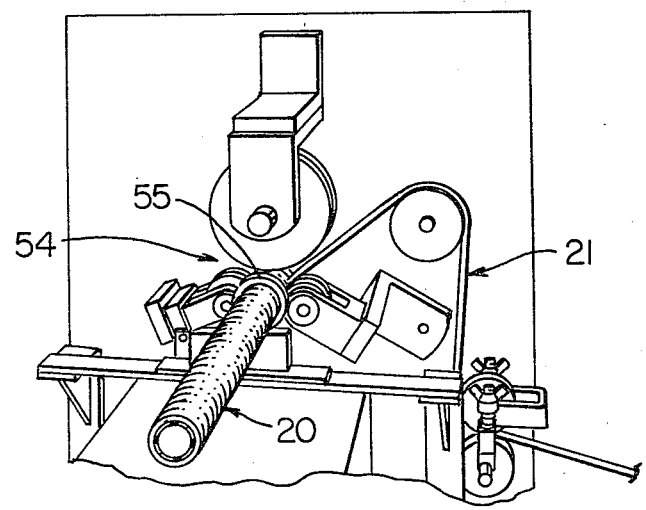
FIG. 3 is a perspective view looking at one end of an exemplary apparatus and method for helically winding the strip of FIG. 1 to define one example of the convoluted hose construction of this invention.
Figure 4:
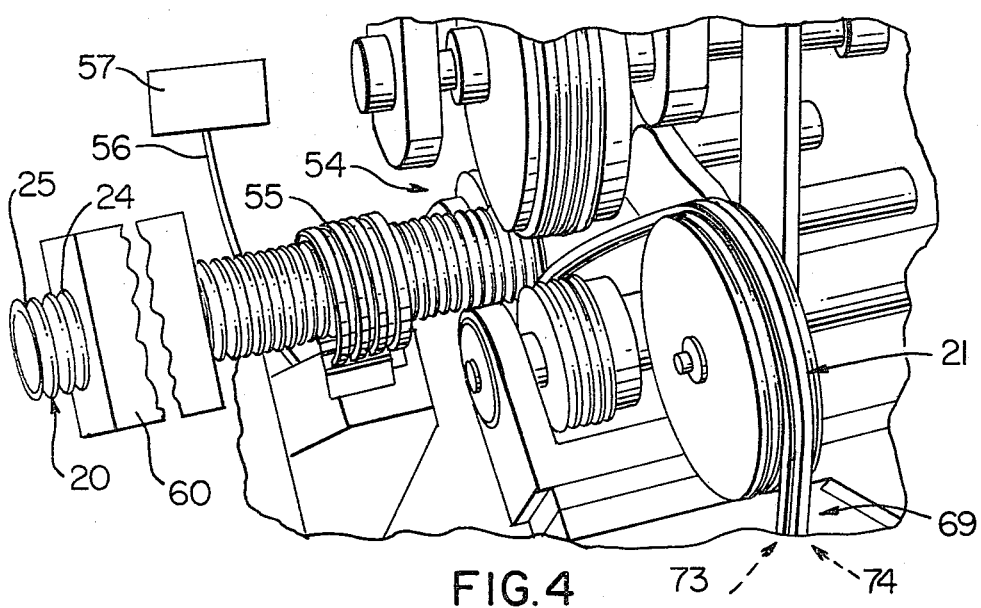
FIG. 4 is a perspective view illustrating the helical winding of the polymeric strip of FIG. 1 and the utilization of an induction coil to heat an electromagnetically heatable material disposed between the first and second connecting means of such polymeric strip to define a convoluted hose construction.

The strip 21 is wound in a helical pattern while simultaneously connecting the first connecting means 22 and second connecting means 23; and, this helically winding step or action is shown in FIGS. 3 and 4 employing a set of cooperating winding rollers and such set is designated generally by the reference numeral 54. The rollers of the set 54 cooperate in a manner well known in the art so that during the helically winding step the strip 21 is formed into the resulting hose construction 20 having alternating crests 24 and troughs 25.

In accordance with the teachings of this invention the disposing step comprises disposing the electromagnetically heatable material 26 which is defined as an integral part of the first connecting means 22 between such connecting means 22 and the second connecting means 23 during the step of helically winding the strip 21 while simultaneously connecting the first connecting means 22 and second connecting means 23.

The electromagnetically heatable material 26 is then subjected to electromagnetic action after helically winding the strip 21 and this subjecting step is achieved by passing the helically wound strip through an electrical induction coil 55 as shown in FIG. 4. The coil 55 is a commercially available coil and preferably is of the water cooled type. The coil 55 is energized through an electrical cable assembly 56 which is supplied with electrical power from an induction generator 57. The generator 57 provides between one to five kilowatts of output power at an output frequency ranging between 3 and 30 mHz.

As the material 26 is passed through the coil 55 it is subjected to the action of such coil 55 causing heating of the material 26 and in particular causing heating of the magentic particles 52 embedded within the polymeric part of such material with such polymeric part serving as a matrix for the particles 52. In essence, this heating is from the interior of the material 26 outwardly and provides a partial melting of such material 26 (and in particular matrix M of such material and a partial melting of the polymeric material defining the strip 21 and particularly the connecting means 22 and 23 thereof. The partially molten material 26 provides a tenacious heat fused bond, upon cooling, between the first connecting means 22 and the second connecting means 23. This heat fused action is achieved during continuous forming of the hose 20, yet the resulting hose 20 has optimum strength and is capable of containing fluids under conditions of either substantial pressure or vacuum for numerous applications. It will also be appreciated that a tenacious heat-fused bond is provided at the interface of the connecting means 22–23 adjoined by the material 26 with the usual intermeshing contact between connecting means 22 and 23 and without need for additional contact pressure therebetween during induction heating by coil 55 and subsequent cooling of the material 26 and entire hose 20.

The partially molten material 26 is cooled simultaneously with the cooling of the remainder of the convoluted hose 20 following movement of the hose through the induction coil 55. The cooling action may be achieved utilizing any suitable technique or means known in the art and in this example of the invention the cooling is achieved utilizing a cooling device 60 as illustrated in FIG. 4 of the drawings. The cooling device 60 may employ any suitable fluid including air, tap water, and the like.

Following cooling in the cooling device 60 the completed hose 20 is air dried, preferably using ambient air. The hose 20 may then be cut to desired lengths or wound in roll form to define a supply roll thereof, and in accordance with practice which is standard in the art.

During the process of helically winding the polymeric strip 21 the winding action may be achieved while supplying the strip from any suitable supply source, as shown at 69 in FIG. 4. For example, the strip may be supplied at 69 by movement thereof directly from the extrusion apparatus 35 and as is indicated schematically by the dotted arrow 73. In providing the strip 21 directly from the extrusion apparatus 35, as indicated schematically by arrow 73, the strip may be in a partially heated condition during the helical winding thereof and passage through the induction coil 55 whereby a more tenacious bond is provided between adjoining turns of the strip 21. However, the strip 21 may be provided from a suitable supply roll thereof and to indicate this alternative a dotted arrow 74 is shown in FIG. 4 as a schematic representation of such a supply roll.

Figure 8:
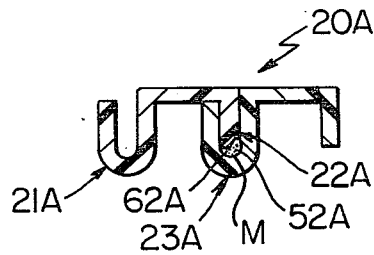
FIG. 8 is a view similar to FIG. 6 and drawn to a reduced scale, illustrating another exemplary embodiment of the hose construction of this invention.

Another typical exemplary embodiment of the hose construction or hose of this invention is illustrated in FIG. 8 of the drawings, in fragmentary view. The hose of FIG. 8 is very similar to the hose 20; therefore, such hose will be designated by the reference numeral 20A and representative parts of such hose which are similar to corresponding parts of the hose 20 will be designated in the drawings by the same reference numerals as in the hose construction 20 (whether or not such representative are mentioned in the specification) followed by the letter designation A and not described again in detail. Only those component parts of the hose 20A which are different from corresponding parts of the hose 20 will be designated by a new reference numeral also followed by the letter designation A and described in detail.

The hose construction 20A of FIG. 8 is also comprised of polymeric strip 21A having first connecting means 22A and second connecting means 23A defining opposite side edge portions thereof; and, the strip 21A is disposed in a helical pattern with the first connecting means 22A and second connecting means 23A connected together to define the hose construction 20A having alternating crests and troughs.

The main difference between the hose construction 20A and the hose 20 is that the hose 20A has electromagnetically heatable material disposed between the first and second connecting means 22A and 23A respectively which is in the form of a polymeric component which is designated by the reference numeral 62A. The component 62A is introduced into position during the helically winding step and as will be described subsequently herein. The component 62A has randomly disposed magnetic particles 52A embedded in a polymeric matrix M and such particles 52A are heatable by electromagnetic induction. The component 62A may be made in any one of a plurality of forms and in this example of the invention a plurality of two forms is shown and described.

Figure 10:
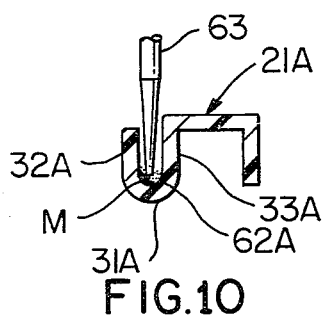
FIG. 10 is a view particularly illustrating the step of disposing an electromagnetically heatable material in the form of a continuous elongate polymeric bead between first and second connecting means of the strip during helical winding thereof as shown in FIG. 9.
Figure 9:
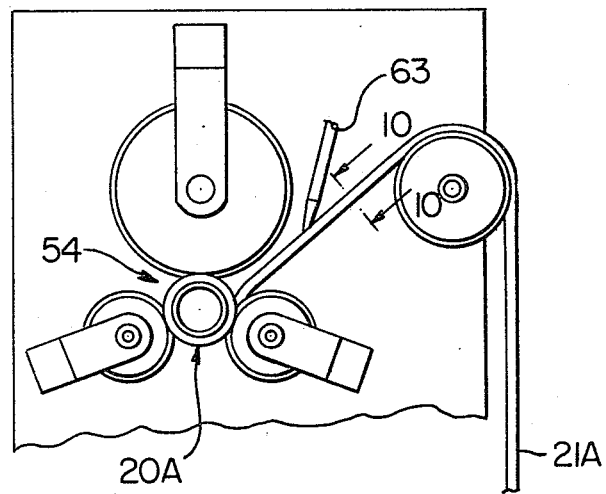
FIG. 9 is an end view of an apparatus and method steps which may be used in forming the hose construction of FIG. 8.

In the illustration of FIGS. 9–10 the component 62A is in the form of a continuous elongate polymeric bead which is disposed during the disposing step by extrusion thereof between the first and second connecting means 22A and 23A respectively. The extrusion is achieved using a suitable extruder (not shown) which may be similar to the extruder 45 and such extruder employs a nozzle 63 operatively connected thereto which enables deposition of the component 62A in the form of a semi-molten bead 62A (FIG. 10) against the inside surface of the bight 31A and between the parallel legs 32A and 33A of the strip 21A and as shown in FIG. 10. The semimolten bead is comprised of polymeric matrix material M and magnetic particles 52A randomly disposed therein. The deposition is achieved prior to the step of helically winding the strip 21A utilizing the set 54 of cooperating rollers which is the same set 54 used in helically winding the strip 21.

Figure 11:
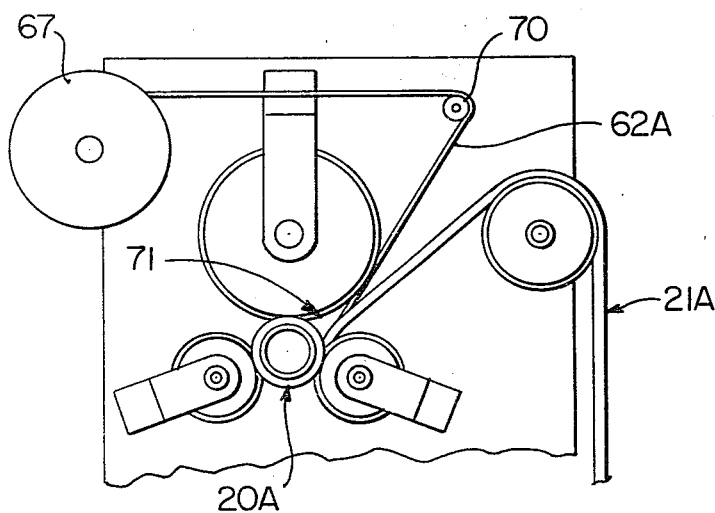
FIG. 11 is a view similar to FIG. 9 illustrating another exemplary embodiment of apparatus and method steps which may be employed in defining the hose construction of FIG. 8 wherein the polymeric component is in the form of a continuous polymeric thread-like member.

The step of disposing a separate component may comprise defining the component as a continuous polymeric thread-like member also designated by the reference numeral 62A and as illustrated in FIG. 11. The thread-like member 62A may be provided in roll form on a supply roll 67 thereof which is supported for unwinding rotation. The member 62A of FIG. 11 is passed around an idler roller 70 and is wrapped between the first connecting means 22A and second connecting means 23A during connecting of such connecting means in the winding step as illustrated at 71 in FIG. 11. The thread-like member 62A is also comprised of the matrix M and magnetic particles 52A.

However, regardless of how the electromagnetically heatable material is defined, whether as an integral part of one of a pair of connecting means of a strip, as a separate component or member defined as a bead by direct extrusion thereof from an extruder, or as a thread-like member, the unique aspect of this invention is that a strip of material which is usually difficult to bond in a continuous manner to define a hose construction or hose may be continuously bonded to provide a hose of high quality.

The hose construction or hose of this invention may be made of polyethylene, polypropylene or any material used in the hose art which is capable of being made into a strip, helically wound, and bonded during helical winding. Further, such hose construction or hose is preferably made utilizing any elastomeric thermoplastic material which has resiliency and plastic memory.

The polymeric matrix M comprising material 26 and the polymeric matrix M used to define the matrix M of component 62A (whether in bead or thread-like form) is preferably the same material as the polymeric material defining the associated strip, either 21 or 21A, being helically wound. However, it is to be understood that any suitable polymeric matrix material M may be used which is compatible with the material utilized to define its associated strip.

Reference has been made herein to the utilization of particles 52 or 52A embedded in the matrix M of polymeric material and it is to be understood that any suitable particles may be utilized including metal particles, particles of ferrous oxide, or the like. The particles are preferably micron-sized magnetic particles.

In this disclosure of the invention the term electromagnetically heatable material has been used throughout. However, it is to be understood that such term is intended to encompass not only electromagnetically heatable material where the heating action as produced by induction heating as described herein but is also intended to encompass heating action as produced by dielectric heating.

While present exemplary embodiments of this invention, and methods of practicing the same, have been illustrated and described, it is to be understood that this invention may be otherwise variously embodied and practiced within the scope of the following claims.

What is claimed is:

1. In a method of making a convoluted hose construction comprising the steps of; providing a polymeric strip having first and second connecting means defining opposite side edge portions thereof; and helically winding said strip while simultaneously connecting said first and second connecting means to define said hose construction having alternating crests and troughs; the improvement comprising the steps of, disposing an electromagnetically heatable material between said first and second connecting means, subjecting said material to electromagnetic action following said helically winding step causing heating and partial melting thereof, and cooling the partially molten material and hose construction defined by said strip thereby providing a tenacious heat fused bond between said first and second connecting means, said providing step comprising extruding said strip employing an extrusion apparatus and defining said electromagnetically heatable material by extrusion thereof simultaneously with the extrusion of said strip through an associated extrusion head assembly and as an integral part of at least one of said side edge portions of the polymeric strip and said disposing step comprises disposing said integral part between said first and second connecting means.

* * * * *